US009525186B2

(12) United States Patent
Barton

(10) Patent No.: US 9,525,186 B2
(45) Date of Patent: Dec. 20, 2016

(54) HYDROGEN GAS GENERATOR WITH FLEXIBLE FEED MEMBER

(71) Applicant: Intelligent Energy Inc., San Jose, CA (US)

(72) Inventor: Russell H. Barton, New Westminster (CA)

(73) Assignee: Intelligent Energy Inc., San Jose, CA (US)

( * ) Notice: Subject to any disclaimer, the term of this patent is extended or adjusted under 35 U.S.C. 154(b) by 186 days.

(21) Appl. No.: 14/462,400

(22) Filed: Aug. 18, 2014

(65) Prior Publication Data

US 2014/0356741 A1 Dec. 4, 2014

Related U.S. Application Data

(63) Continuation of application No. PCT/US2013/025487, filed on Feb. 11, 2013.
(Continued)

(51) Int. Cl.
*H01M 8/06* (2016.01)
*B01J 7/00* (2006.01)
(Continued)

(52) U.S. Cl.
CPC .............. *H01M 8/0606* (2013.01); *B01J 7/00* (2013.01); *C01B 3/02* (2013.01); *C01B 3/04* (2013.01);
(Continued)

(58) Field of Classification Search
CPC ............ H01M 8/0606; H01M 8/04201; H01M 8/04208; B01J 7/00; C01B 3/02; Y02E 60/321
See application file for complete search history.

(56) References Cited

U.S. PATENT DOCUMENTS 3,260,620 A 7/1966 Gruber
3,726,649 A 4/1973 Pelham
(Continued)

FOREIGN PATENT DOCUMENTS

EP 1467138 10/2004
JP 2008-309178 12/2008
JP 2008-309179 12/2008

OTHER PUBLICATIONS

International Search Report and Written Opinion dated Apr. 30, 2013, issued in PCT/US2013/025487.

*Primary Examiner* — Jonathan Jelsma
(74) *Attorney, Agent, or Firm* — Baker & Hostetler LLP

(57) ABSTRACT

A hydrogen generator (30) and fuel cell system are disclosed. The hydrogen generator (30) includes a housing (32) and a flexible feed member (56) including a flexible carrier (64) and a hydrogen-containing reactant (62) disposed on the carrier. The flexible feed member (56) may include a reactant having a braided carrier on the outside or a flexible strip having a carrier with reactant disposed thereon. The hydrogen-containing reactant (62) will release hydrogen gas when heated. The hydrogen generator further includes a heating system including a heater (48) and a pinch roller system (40) for feeding the flexible feed member (56) to position the flexible feed member in proximity to the heater (48), such that the heater is capable of heating the hydrogen-containing reactant to release hydrogen gas. The fuel cell system includes a fuel cell having a hydrogen gas input port and a hydrogen generator.

18 Claims, 3 Drawing Sheets

Related U.S. Application Data

(60) Provisional application No. 61/599,468, filed on Feb. 16, 2012.

(51) Int. Cl.
*H01M 8/04* (2016.01)
*C01B 3/04* (2006.01)
*C01B 3/02* (2006.01)
*H01M 8/22* (2006.01)

(52) U.S. Cl.
CPC ..... *H01M 8/04201* (2013.01); *H01M 8/04208* (2013.01); *H01M 8/065* (2013.01); *H01M 8/22* (2013.01); *C01B 2203/066* (2013.01); *Y02E 60/364* (2013.01); *Y02E 60/50* (2013.01)

(56) References Cited

U.S. PATENT DOCUMENTS

| | | |
|---|---|---|
| 4,196,525 A | 4/1980 | Ebdon |
| 6,653,007 B2 | 11/2003 | McWhorter |
| 7,832,433 B2 | 11/2010 | Curello |
| 2002/0088178 A1 | 7/2002 | Davis |
| 2004/0202904 A1* | 10/2004 | Gore ............ F17C 11/00 429/421 |
| 2008/0032167 A1 | 2/2008 | Matsuoka et al. |
| 2008/0035669 A1 | 2/2008 | Curello et al. |

* cited by examiner

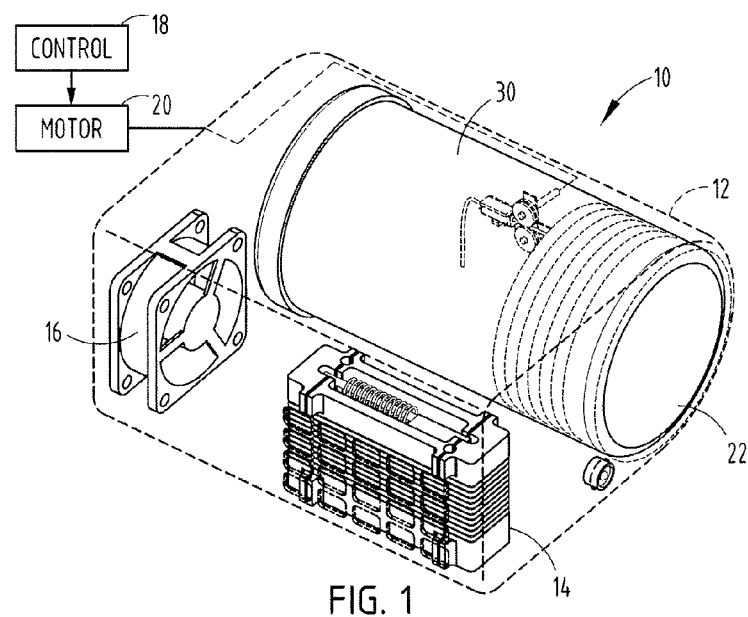
FIG. 1
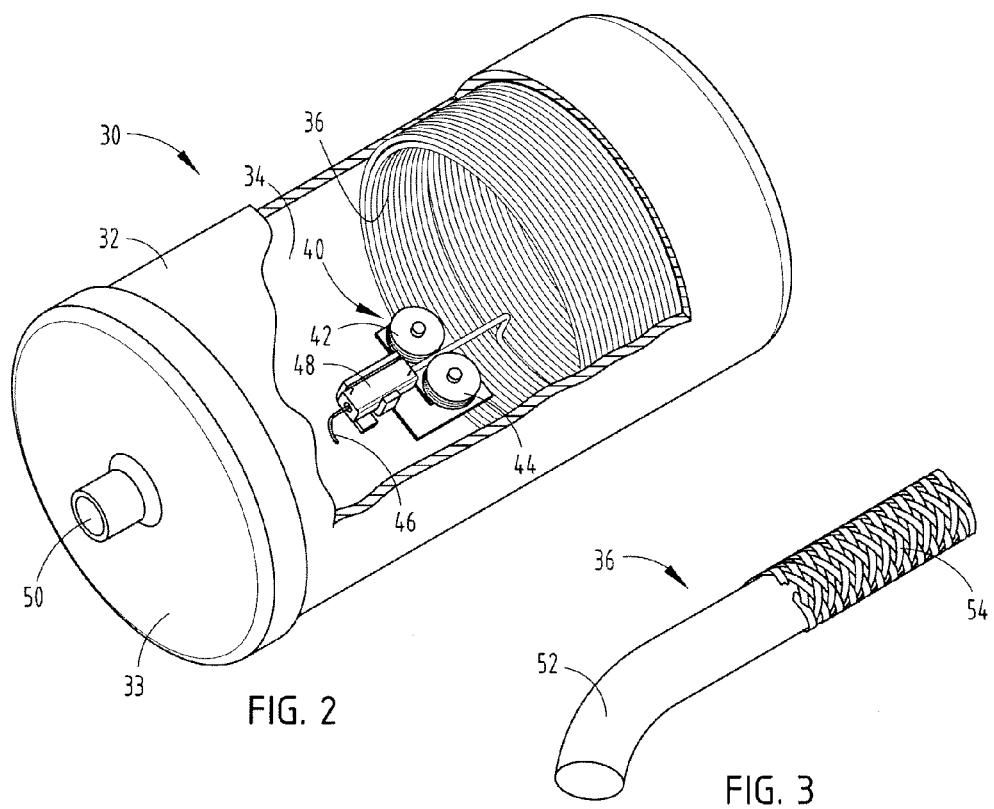
FIG. 2
FIG. 3

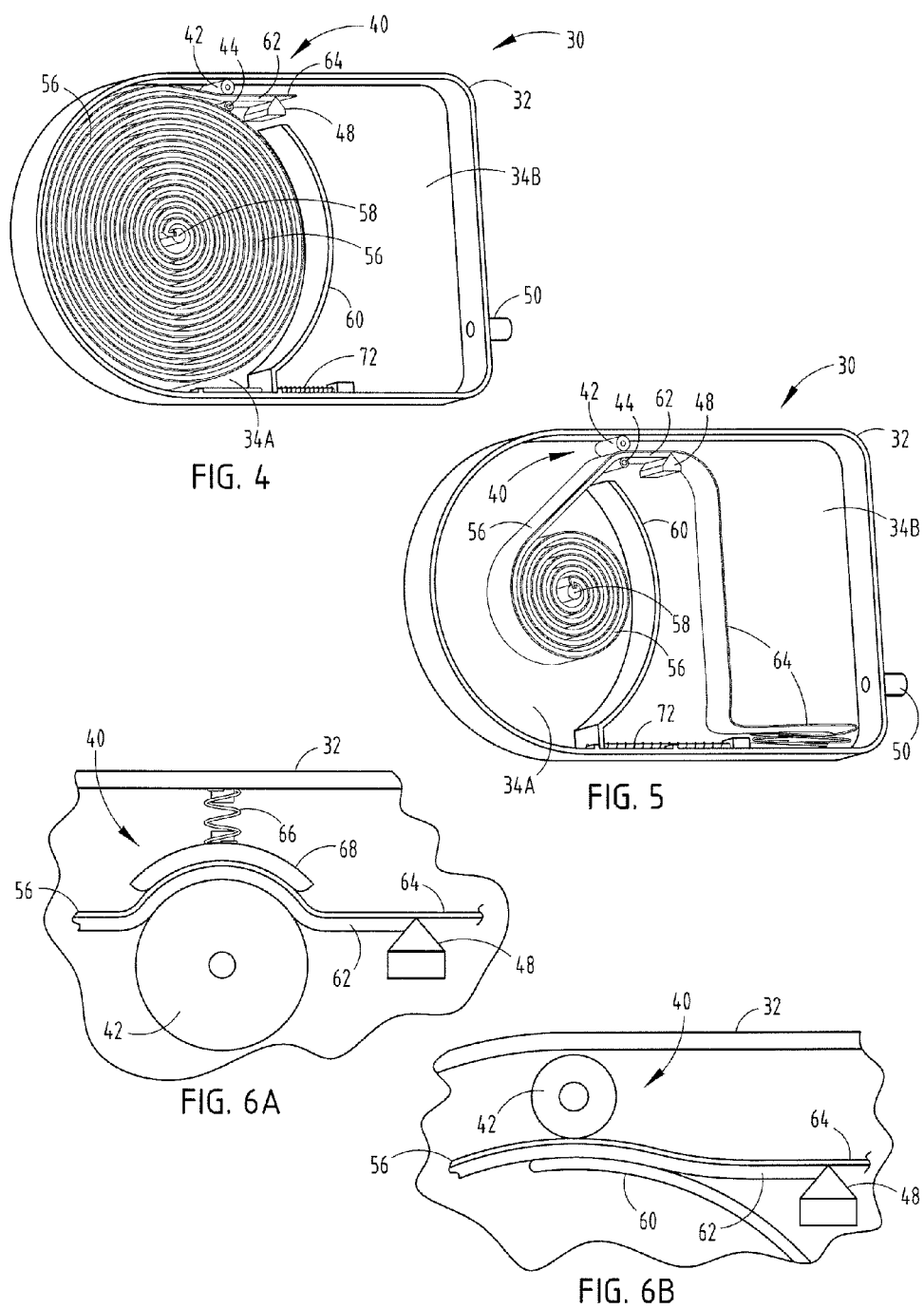

HYDROGEN GAS GENERATOR WITH FLEXIBLE FEED MEMBER

CROSS-REFERENCE TO RELATED APPLICATIONS

This application is a Continuation Application of International patent application PCT/US2013/025487, filed on Feb. 11, 2013, which claims priority to U.S. provisional patent application No. 61/599,468, filed on Feb. 16, 2012, the disclosures of which are incorporated by reference in their entirety.

FIELD OF THE INVENTION

The present invention generally relates to a hydrogen gas generator, and more particularly relates to a hydrogen generator for providing hydrogen gas to a fuel cell system.

BACKGROUND OF THE INVENTION

Interest in fuel cell batteries as power sources for portable electronic devices has grown. A fuel cell is an electrochemical cell that uses materials from outside the cell as the active materials for the positive and negative electrodes. Because a fuel cell does not have to contain all of the active materials used to generate electricity, the fuel cell can be made with a small volume relative to the amount of electrical energy produced compared to other types of batteries.

Fuel cells can be categorized according to the types of materials used in the positive electrode (cathode) and negative electrode (anode) reactions. One category of fuel cell is a hydrogen fuel cell using hydrogen as the negative electrode active material and oxygen as the positive electrode active material. When such a fuel cell is discharged, hydrogen is oxidized at the negative electrode to produce hydrogen ions and electrons. The hydrogen ions pass through an electrically nonconductive, ion permeable separator and the electrons pass through an external circuit to the positive electrode, where oxygen is reduced.

In some types of hydrogen fuel cells, hydrogen is formed from a fuel supplied to the positive electrode side of the fuel cell, and hydrogen is produced from the supplied fuel. In other types of hydrogen fuel cells, hydrogen gas is supplied to the fuel cell from a source outside the fuel cell. A fuel cell system can include a fuel cell battery, including one or more fuel cells (such as a fuel cell stack), and a hydrogen source, such as a fuel tank, a hydrogen tank or a hydrogen gas generator. Gas generators that supply gas to a fuel cell can be an integral part of the fuel cell system, they can be removably coupled to the fuel cell system, or they can include replaceable components containing reactants. A removable gas generator can be replaced with another one when the gas producing reactants have been consumed. Removable gas generators can be disposable (intended for only a one-time use) or refillable (intended for use multiple times) to replace consumed reactant materials.

A hydrogen gas generator uses one or more reactants containing hydrogen that can react to produce hydrogen gas. Hydrogen generators can produce hydrogen using a variety of reactants and a variety of methods for initiating the hydrogen generating reactants. The reaction can be initiated in various ways, such as hydrolysis and thermolysis. For example, two reactants can produce hydrogen and byproducts. Examples of hydrogen containing materials include liquid or gaseous hydrocarbons (such as methanol), hydrides (such as metal hydrides and chemical hydrides), alkali metal silicides, metal/silica gels, water, alcohols, dilute acids and organic fuels (such as N-ethylcarbazon and perhydrofluorene). A hydrogen containing compound can react with another reactant to produce hydrogen gas when the reactants are mixed together, in the presence of a catalyst, heat or an acid, or a combination thereof. A hydrogen containing compound can be heated to evolve hydrogen in a thermochemical decomposition reaction.

In selecting reactants for use in a hydrogen generator, consideration may be given to the following: (a) stability during long periods of time when the hydrogen generator is not in use, (b) ease of initiation of a hydrogen generating reaction, (c) the amount of energy that must be provided to sustain the hydrogen generating reaction, (d) the maximum operating temperature of the hydrogen generating reaction, and (e) the total volume of hydrogen that can be produced per unit of volume and per unit of mass of the reactant(s).

In order to provide hydrogen over a long period of time without developing a very high pressure within the hydrogen generator, it is desirable to generate the hydrogen on an as-needed basis. This requires controlling the reaction of the reactant(s), such as by reacting only a limited quantity at a time.

It is desirable to provide a hydrogen generator capable of supplying hydrogen gas to a fuel cell stack that has one or more of the following features: capable providing a large total volume of hydrogen gas per unit of mass and per unit of volume of the hydrogen generator, capable of controlling the reaction of the reactant(s) to efficiently provide hydrogen on an as-needed basis without producing an excessive internal pressure within the hydrogen generator, able to operate at or below a desired maximum temperature, all or a portion of the hydrogen generator in a fuel cell system can be replaced after reactants have been consumed, long-term durability and reliability and easy and economic manufacturing.

SUMMARY OF THE INVENTION

According to one aspect of the present invention, a hydrogen gas generator is provided. The hydrogen generator includes a housing. The hydrogen generator also includes a flexible feed member including a flexible carrier and a hydrogen-containing reactant disposed on the carrier. The hydrogen-containing reactant will react to release hydrogen gas when heated. The hydrogen generator further includes a heating system including a heater and a pinch roller system for feeding the flexible feed member to position the flexible feed member in proximity to the heater such that the heater is capable of heating the hydrogen-containing reactant to release hydrogen gas. Embodiments can include one or more of the following features:

- the pinch roller system includes first and second pinch rollers, wherein movement of the flexible feed member is controlled by at least one the first and second pinch rollers;
- the pinch roller system includes a first pinch roller for engaging one side of the flexible feed member and a second pinch roller for engaging a second side of the flexible feed member;
- the pinch roller system includes a first actuatable roller engaging a first side of the flexible feed member and a stationary member engaging an opposite side of the flexible feed member;
- the second member includes a curved surface engaging the second side of the flexible feed member;

the pinch roller system is controlled to stop movement of the feed member toward the heater when hydrogen generation is not needed and reverses direction of movement of the feed member a distance sufficient to quench the reaction and stop generation of hydrogen;

the pinch roller system includes a thermally conductive material in contact with the feed member to cool the feed member when a reacting portion of the feed member is in close proximity to the feed roller system during the reverse direction of movement;

the flexible feed member is formed into a fiber having the carrier formed around the reactant, and wherein the fiber is pulled by the feed roller system from a storage area;

the fiber includes extruded reactant and the carrier forms a covering;

the flexible feed member includes a thin strip having a reactant disposed on at least one side of the carrier;

the strip is wound on a feed reel disposed within the housing;

the carrier winds onto a take up reel after the reactant is heated;

the hydrogen generator includes a wall within the housing defining a storage compartment for storing the feed member; the wall may be movable to reduce the size of the storage area as the feed member is fed by the pinch roller system; the movable wall may separate the storage compartment from a waste compartment within the housing;

the heater includes an electric heater;

the hydrogen generator further includes a controller for controlling actuation of the pinch roller system to feed the flexible feed member; and the hydrogen generator is adapted to be coupled to a fuel cell to supply hydrogen to the fuel cell.

According to another aspect of the present invention, a fuel cell system is provided. The fuel cell system includes a fuel cell including a hydrogen gas input port and a hydrogen generator. The hydrogen generator includes a housing. The hydrogen generator also includes a flexible feed member including a flexible carrier and a hydrogen-containing reactant disposed on the carrier, wherein the hydrogen-containing reactant will react to release hydrogen gas when heated. The hydrogen generator further includes a heating system including a heater and a pinch roller system for feeding the flexible feed member to position the flexible feed member in proximity to the heater such that the heater is capable of heating the hydrogen-containing reactant to release hydrogen gas. Further embodiments may include the hydrogen generator provided as a cartridge adapted to be coupled to the hydrogen gas input port such that the hydrogen generator is removable from the fuel cell.

According to a further aspect of the present invention, a method of generating hydrogen with a hydrogen generator is provided. The method includes the step of providing a flexible feed member in a housing, the flexible feed member including a flexible carrier and a hydrogen-containing reactant disposed on the carrier, wherein the hydrogen-containing reactant will release hydrogen gas when heated. The method also includes the step of actuating a pinch roller system to feed the flexible feed member to position the flexible feed member in proximity to a heater such that the heater is capable of heating the hydrogen-containing reactant to release hydrogen gas. The method further includes the steps of stopping movement of the feed member toward the heater when the hydrogen gas is not needed and reversing direction of movement of the feed member a distance sufficient to quench the reaction and stop generation of hydrogen.

Unless otherwise specified herein, all disclosed characteristics and ranges are as determined at room temperature (20-25° C.).

These and other advantages of the invention will be further understood and appreciated by those skilled in the art by reference to the following written specification, claims, and appended drawings.

BRIEF DESCRIPTION OF THE DRAWINGS

In the drawings:

FIG. 1 is a perspective view of a fuel cell system employing a hydrogen generator, according to one embodiment;

FIG. 2 is a partial sectional perspective view of a hydrogen generator employing a flexible feed member having reactant in the form of a fiber, according to a first embodiment;

FIG. 3 is an enlarged view of the fiber formed feed member containing the reactant and a braided carrier shown partially removed, according to one embodiment;

FIG. 4 is a perspective view of a hydrogen generator employing a flexible feed member in the form of a flexible strip having a carrier and reactant, according to a second embodiment;

FIG. 5 is a perspective view of the hydrogen generator shown in FIG. 3 with the flexible strip of reactant partially consumed;

FIG. 6A is an enlarged view of a pinch roller system for feeding the flexible strip of reactant, according to another embodiment;

FIG. 6B is an enlarged view of a pinch roller system for feeding the flexible strip of reactant, according to a further embodiment;

DETAILED DESCRIPTION OF THE PREFERRED EMBODIMENTS

Figure 7:
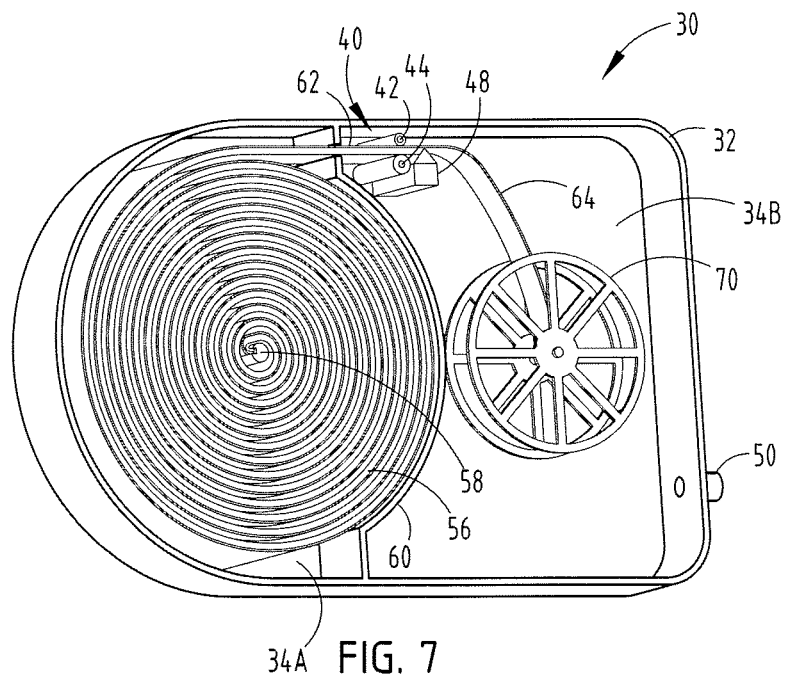
FIG. 7 is a perspective view of a hydrogen generator employing a flexible strip of reactant and a take-up reel, according to another embodiment.

A hydrogen generator that produces hydrogen gas and a fuel cell system are disclosed. The hydrogen gas can be used by a hydrogen consuming system, such as the fuel cell system including a fuel cell stack that produces electricity for an electronic device. The hydrogen generator includes a housing, a flexible feed member, a heating (e.g., ignition) system including a heater to heat reactant, and a pinch roller system. The flexible feed member includes a flexible carrier and a hydrogen-containing reactant disposed on the carrier. The hydrogen-containing reactant will react to release hydrogen gas when heated. The pinch roller system feeds the flexible feed member to position the flexible feed member in proximity to the heater such that the heater is capable of heating the hydrogen-containing reactant to release hydrogen gas. The hydrogen generator may be used in a fuel cell system to supply generated hydrogen on an as needed basis to a fuel cell.

One or more reactants are contained in a solid composition that is disposed on a carrier. In one embodiment, the flexible feed member can be formed into the shape of a single fiber or multiple fibers (e.g., with the fibers twisted into cord or twine), with the carrier found around a core of reactant or the feed member can have a reactant formed around a carrier core. The flexible feed member is pulled by a pinch roller system from the storage area into proximity with a heater in a reaction area. The feed member may include an extruded reactant core having a covering coated on or wrapped around the reactant core. For example, the carrier can be a braided carrier. The carrier may include polyester, cellulose, cotton or paper. Alternatively, the carrier could be soft iron wire with the reactant extruded around the wire. The reactant and carrier form a flexible feed member. According to another embodiment, the flexible feed member is a flexible strip having the carrier provided as a thin belt-like member and the reactant molded or bonded thereto such that the feed member is flexible. The carrier strip may include a plastic such as a polyester film or a decomposable paper and may be in the form of a solid or porous sheet, screen or mesh for example. The flexible feed member can be made in a simple process, such as molding, extruding, depositing, coating, printing and so on. The size of the flexible feed member including the height, width and length can be chosen to provide a desired quantity of hydrogen, based on the size of the fuel cell stack and the power requirements of the electronic device as well as the volume available in the hydrogen generator.

The reactant in the flexible feed member contains elemental hydrogen that is released as hydrogen gas when the feed member is heated sufficiently by way of a heater. The hydrogen gas produced by this reaction travels through a hydrogen flow path from the reactant to a hydrogen outlet valve in the casing or housing.

At least one hydrogen-containing reactant is included in the flexible feed member. More than one reactant can be included. Examples of reactants that can evolve hydrogen gas upon thermal decomposition include: lithium idide ($Li_2NH$), lithium amide ($LiNH_2$), an ammonium halide (e.g., $NH_4F$, $NH_4Cl$ or $N_2H_6Cl_2$) plus a chemical hydride (e.g., $LiH$, $LiBH_4$, $NaBH_4$, $LiAlH_4$ or $NaAlH_4$), alane ($AlH_3$), ammonia borane ($NH_3BH_3$), ammonia borane plus a chemical hydride (e.g., alane or a boron hydrazine complex such as hydrazine bisborane ($N_2H_4(BH_3)_2$)), ammonium nitrate ($NH_4NO_3$) plus diammonium decaborane ($B_{10}H_{10}(NH_4)_2$), sodium boronydride, alanates, e.g., sodium alanate ($NaAlH_4$) and other materials, such as grapheme and carbon nanotubes with hydrogen inserted therein.

The hydrogen-containing reactant can also contain one or more additives. Examples of additives include binders (e.g., acrylates and styrene block copolymers), stabilizing compounds (e.g., solid bases), reaction accelerators (e.g., solid acids), catalysts (e.g., $Fe_2O_3$, $TiCl_3$), ignition materials as described below, thermally conductive materials (e.g., metals, graphites and combinations and composites thereof), and so on. Rubber cement may be added to the reactant as a binder (e.g., 50%) to hold the reactant together as the feed member flexes.

The flexible feed member is sufficiently flexible to be fed at a controlled speed from the storage area into thermal proximity with the heater by the pinch roller system. The flexible feed member can be loaded into the housing as a roll having an overlapping wrap that can be pulled from a center of the wrap by the pinch roller system, according to one embodiment. In another embodiment, the flexible feed member may include a flexible strip loaded into the housing on a feed reel. The flexible strip may be pulled by the pinch roller system to pull the flexible feed strip such that it unwinds from the feed reel. Following heating of the reactant, the carrier may be taken up on a take-up reel, according to one embodiment. The flexible feed member can be disposed in a storage compartment within the housing that is separated by a wall from the used carrier and other byproducts.

To limit or prevent the transfer of heat along the length of the flexible feed member on the carrier, which could result in uncontrolled initiation of the reaction of adjacent reactant material, the carrier can be a material that is not a good conductor of heat. The carrier can be made from a material that does not react substantially during the thermal decomposition of the hydrogen-containing reactant. This has the advantage of not generating any reaction products that might interfere with the functioning of the hydrogen generator or that would have to be removed from the hydrogen gas before being used by the fuel cell stack. Alternatively, the carrier can be made from a material that does react during the thermal decomposition of the hydrogen-containing reactant, e.g., by burning. This can eliminate the need to collect and store the carrier after the reactant has been consumed. Examples of materials that can be suitable as carrier materials include polyimides such as KAPTON® from E.I. DuPont de Nemours; polypropylene such as SCLAIR® from Nova Chemicals (International) (Switzerland); TEFLON®, TEFZEL® and MYLAR® from E.I. DuPont de Nemours.

The heating system heater heats a portion of the flexible feed member at the end of the reactant in proximity to the heater, resulting in thermal decomposition reaction of the hydrogen-containing reactant in the flexible feed member. The heating system can include more than one heater. Multiple heaters can be advantageous when a single heater does not produce sufficient heat, when more than one flexible feed member is to be reacted at one time, and when the hydrogen generator uses more than one flexible feed member, for example. Various types of heaters can be used. Examples of heaters include resistive heaters, inductive heaters, infrared heaters, laser heaters, microwave heaters, semiconductor bridges and so on.

Alternatively, heating elements can be incorporated into the flexible feed member or into the carrier. Electrical leads from the heating system can make contact with heating element contacts so current to heat the heating elements is provided when the flexible feed member is positioned in the desired location.

The heater can heat the hydrogen-containing reactant directly, or it can heat an ignition material (a material that will react exothermally, producing the heat necessary for the thermal decomposition reaction of the hydrogen-containing reactant). If the heater initiates reaction of the hydrogen-containing reactant directly, the heater may provide heat only long enough to start the reaction, if the reaction is self-sustaining, or it may continue to provide heat for the entire reaction time. If an ignition material is used, the ignition material can be disposed within or in contact with a flexible feed member, the ignition material can be a separate layer of the flexible feed member (i.e., separate from a layer containing the hydrogen-containing reactant), or the ignition material can be mixed with the hydrogen-containing reactant. Examples of ignition materials (some of which can also contribute to the hydrogen yield) include iron powder or $TiH_2$ plus $KClO_4$, $MnO_2$ plus $LiAlH_4$, Ni plus Al, Zr plus $PbCrO_4$, $Fe_2O_3$ plus Al (thermite), and $LiAlH_4$ plus $NH_4Cl$.

The hydrogen generator can include a waste zone for accumulating decomposing reactant and any residue (e.g., carrier material, ashes or other reaction or combustion byproducts) from the flexible feed member. The waste zone can be separated from the feed member storage compartment by a wall. The wall can be a moving wall that defines a portion of the storage compartment. The wall can move as the feed member is consumed, thereby reducing the size of the storage compartment and increasing the size of the waste area.

A control system can be used to control the hydrogen generator. Operation of the control system, the heating system or both can be controlled in various ways. The control system can determine the need for hydrogen by monitoring the pressure within the fuel cell system, one or more electrical characteristics of the fuel cell stack, or one or more electrical characteristics of the electronic device, for example. The controller may communicate with the device or the fuel cell stack to determine when more hydrogen is needed. The control system can be completely or partially disposed in the hydrogen generator, the fuel cell stack, the electronic device being powered by the fuel cell stack, or any combination thereof. The control system can include a microprocessor or micro controller; digital, analog and/or hydride circuitry; solid state and/or electromechanical switching devices; capacitors, sensing instrumentation, and so on. The control system can control the feed of the flexible feed member from the storage compartment into proximity of the heater, and can stop movement of the flexible feed member when hydrogen generation is not needed and further may reverse direction of the feed member a distance sufficient to quickly quench the reaction and stop generation of the hydrogen.

The pinch roller system includes first and second pinch rollers, according to one embodiment, wherein movement of the flexible feed member is controlled by the first and second pinch rollers. The first pinch roller engages one side of the flexible feed strip and the second pinch roller engages the second side of the flexible feed member. One or both of the first and second pinch rollers may be actuated by a motor. The pinch roller system may include a thermally conductive material in contact with the feed member to thermally cool the feed member when a reacting portion of the feed member is in close proximity to the feed roller system, particularly during the reverse direction of movement of the feed member. The pinch roller system may include a first actuatable roller engaging a first side of the feed member and a stationary member engaging an opposite second side of the feed member, according to another embodiment. The second member may include a curved surface engaging the second side of the feed member.

The housing of the hydrogen generator is made of a material that will withstand the heat and internal pressure that are produced to maintain desired dimensions and an adequate hydrogen seal. Examples of materials that may be suitable include metals such as aluminum and steel and polymeric materials such as polyphenylene sulfide and acrylonitrile butadiene styrene.

The hydrogen generator can include various filters and/or purification units to remove undesired reaction byproducts and other contaminants from the hydrogen gas.

The hydrogen generator can also include various fittings, valves and electrical connections for providing hydrogen to and interfacing with the fuel cell stack and/or an electrical appliance being provided with power by the fuel cell system.

The hydrogen generator can include various safety features such as a pressure relief vent to release excessive pressure and a mechanism to stop the feeding of the flexible feed member to the ignition system if the internal temperature exceeds an established limit.

Referring to FIG. 1, a fuel cell system 10 is generally shown arranged within a fuel cell system housing 12. The fuel cell system housing 12 may include a fuel cell compartment provided in an electrically powered device, such as a computer. The fuel cell system 10 includes a fuel cell 14 also referred to herein as a fuel cell stack. The fuel cell stack 14 has a hydrogen gas input (not shown) to receive and consume hydrogen gas to generate electricity which, in turn, may be supplied to the electrically powered device. The fuel cell stack 14 generally includes positive and negative electrodes as is generally known in the fuel cell art. The hydrogen gas may be used as the negative electrode active material and oxygen may be used as the positive electrode active material.

The fuel cell system 10 also includes a hydrogen generator receptacle 22 having a size and shape adapted to receive a hydrogen generator 30. The hydrogen generator receptacle 22 is shown formed within the fuel cell compartment 12. The hydrogen generator 30 is shown assembled within receptacle 22 for generating and supplying hydrogen gas to the fuel cell stack 14. The hydrogen gas input can receive hydrogen gas from the hydrogen generator 30 via a fluid coupling path (not shown). While a generally cylindrical shaped hydrogen generator 30 is shown and described in connection with FIGS. 1 and 2, it should be appreciated that the hydrogen generator 30 may have other shapes and sizes as should be evident to those skilled in the art. The hydrogen generator 30 may be replaceable, such that a used hydrogen generator may be removed from receptacle 22 and a new hydrogen generator installed therein to generate a fresh supply of hydrogen gas for the fuel cell 14.

In addition, a motor 20 is illustrated coupled to a controller 18. The controller 18 controls the motor 20 which controls the feed of reactant within the hydrogen generator as described herein. The controller 18 may control the generation of hydrogen as desired to meet the needs of the fuel cell stack 14 to provide sufficient electrical power. It should be appreciated that the motor 20 and controller 18 may be located within the fuel cell housing 12 or elsewhere within the fuel cell system 10 or the electrical device employing the fuel cell system 10. It should further be appreciated that the controller 18 and motor 20 could be located within the hydrogen generator 30 or fuel cell stack 14, according to other embodiments. The fuel cell system 10 also includes a cooling fan 16 for cooling the fuel cell stack 14.

FIG. 2 illustrates one embodiment of a hydrogen generator 30. The hydrogen generator 30 includes a housing 32 shown as a canister having a cylindrical side wall with a closed bottom end and a lid 33 that forms a closed top end. The hydrogen generator 30 is configured as a cartridge that may be inserted within a fuel cell receptacle to generate hydrogen gas and supply the generated hydrogen gas to a fuel cell. The hydrogen generator 30 includes a gas outlet 50 shown provided in the lid 33 through which the supply of hydrogen gas may exit the hydrogen generator 30 and pass in fluid communication to a gas inlet port of a fuel cell. While housing 32 is shown having a cylindrical shape, it should be appreciated that other shapes and sizes of the housing may be employed by the hydrogen generator 30.

The hydrogen generator 30 includes a flexible feed member 36 disposed within an internal compartment 34 of the housing 32. The flexible feed member 36 includes a flexible carrier and a hydrogen-containing reactant disposed on the carrier. The hydrogen-containing reactant will release hydrogen gas when heated to a sufficient temperature such as 160° C.-200° C. In one embodiment, the flexible feed member 36 is generally round having a braided carrier wrapped around a core of reactant, as described in further detail below. The feed member 36 may be wound onto a spool, removed from the spool, and disposed as a roll in the compartment 34. The flexible feed member 36 is shown as a roll coiled in a spiral configuration within a storage area of compartment 34. The flexible feed member can be wrapped from the outside inward in a spiral shape similar to a roll of twine such that an end of the flexible feed member 46 can be pulled from the inside or center of the storage compartment.

The hydrogen generator 30 includes a heating system having a heater 48 for heating the flexible feed member 36 to a sufficient elevated temperature to cause the hydrogen-containing reactant to release hydrogen gas. The heater 48 may include an electric heater, according to one embodiment having one or more electric coils. In one embodiment, the heater 48 may be fabricated from a loop of nichrome wire welded to a copper secondary winding of a small transformer. The secondary voltage may be about one-quarter to one-half VAC, with a current of six amps. Other types of heaters, such as those described above, can be used. As an alternative to the heater 48 shown and described herein, individual heating elements can be incorporated into the reactant or into the carrier in close proximity to the reactant. When the flexible feed member 36 is positioned such that electrical leads may contact with heating element electrical contact, electrical current may be provided to heat the heating element.

The hydrogen generator 30 further includes a pinch roller system 40 for feeding the flexible feed member 36 to advance and position the flexible feed member 36 in proximity to the heater 48 such that the heater 48 is capable of heating the hydrogen-containing reactant to release hydrogen gas. The pinch roller system 40 is shown including a first pinch roller 42 and a second pinch roller 44. The first pinch roller 42 contacts the flexible feed member 36 on a first side and the second pinch roller 44 contacts the flexible feed member 36 on the second opposite side. As a result, the pinch roller system 40 frictionally engages or pinches the flexible feed member 36 to pull the flexible feed member 36 from the storage area toward the heater 48 and into proximity with the heater 48 so as to heat the reactant to cause the generation of hydrogen gas. As the flexible feed member 36 is heated, the reactant releases hydrogen gas which is stored within compartment 34 of housing 32 and released through the gas outlet port 50 to be supplied to a hydrogen consuming device, such as a fuel cell or stack of fuel cells.

The flexible feed member 36 includes a carrier that may remain within a waste zone of compartment 34, according to one embodiment. According to another embodiment, the carrier may be burned by the heater 48, leaving byproduct, e.g., ash, to remain in the waste zone. It should be appreciated that other byproducts of the reactant also remain within the waste zone of compartment 34. As the flexible feed member 36 is consumed during the heating, the amount of area consumed by the flexible feed member 36 decreases to allow for an increased waste area to hold the byproduct and hydrogen gas.

Referring to FIG. 3, an enlarged view of a portion of the flexible feed member 36 for a cylindrical shaped embodiment is illustrated. The hydrogen-containing reactant 52 is formed into a generally cylindrical shaped core and is coated by a braided carrier 54. The carrier 54 is a flexible material that holds the core of solid reactant in place. The hydrogen-containing reactant may be extruded, molded, or otherwise formed. The carrier may be wrapped around the core of reactant in a crisscross pattern to form a braided cover. The resulting flexible feed member 36 is flexible, such that it may be coiled into a spiral shape rolled onto itself one layer over the next layer and may be fed by the pinch roller system 40 to heater 48 to generate hydrogen gas. The wound up flexible feed member 36, once consumed, may be replaced by a new roll of feed member, such that the hydrogen generator 30 may be reused. According to other embodiments, the hydrogen generator 30 may be disposable.

Referring to FIGS. 4 and 5, a hydrogen generator 30 is shown employing a strip 56 as a flexible feed member, according to another embodiment. In this embodiment, hydrogen generator 30 includes a feed reel 58 disposed within a storage area 34A of the compartment defined by housing 32. A wall 60 is shown dividing the compartment into a feed strip storage area 34A and a waste area or zone 34B. Wall 60 is spring biased via spring 72 to allow the wall 60 to move to reduce the size of the storage area 34A and increase the size of the waste zone 34B as the strip 56 of reactant is consumed.

Flexible strip 56 is wound onto the feed reel 58 so as to provide overlapping layers in a spiral pattern. The strip 56 is frictionally engaged by the pinch roller system 40 shown including first and second pinch rollers 42 and 44. Actuation of one or both of rollers 42 and 44 causes movement of the strip 56 to advance the strip 56 toward heater 48 so as to heat the reactant and generate hydrogen gas. As the strip 56 is advanced by the pinch roller system 40 toward heater 48, the strip 56 unwinds from the feed reel 58.

The flexible strip 56 includes reactant 62 formed on at least one surface of carrier 64. The carrier is a thin sheet that is flexible and has first and second opposite sides. In the embodiment shown, reactant 62 is disposed on one side of carrier 64 which passes in close proximity to the heater 48. However, it should be appreciated that reactant 62 may be provided on the opposite side of carrier 64 or on both top and bottom surfaces of carrier 64, according to other embodiments.

The hydrogen generator 30 is illustrated in FIG. 5 with the strip 56 of reactant partially consumed. As the strip 56 is advanced by the pinch roller system 40 to unwind from the feed reel 58, reactant 62 when passing in proximity to heater 48 is heated to generate hydrogen gas on an as-needed basis. The carrier 64 may pass beyond heater 48 into the waste zone 34B where it collects as a byproduct. Additionally, the separating wall 60 moves in a direction to increase the volume of the waste zone 34B and decrease the volume of the storage area 34A as strip 56 is unwound from the feed reel 58. Dividing wall 60 may contact strip 56 with a light spring bias force such that the wall 60 automatically moves as the strip 56 is consumed.

In operation, the pinch roller system 40 advances flexible feed strip 56 to bring the reactant 62 in proximity to heater 48 to generate hydrogen gas when needed. When hydrogen gas is not needed, pinch roller system 40 stops the advancement of feed strip 56 such that no new reactant 62 is brought into proximity with the heater 48 to stop the generation of hydrogen. In addition, the pinch roller system 40 may reverse direction of the rollers 42 and 44 to quench the reaction of the heated reactant 62. The rollers 40 and 42 may include a thermally conductive material that quickly cools the reactant 62 as the strip 56 is retracted in a direction from the heater 48 toward the pinch rollers 42 and 44. The pinch rollers 42 and 44 thereby cool the reactant to stop the reaction. As a result, the hydrogen generation is quickly stopped and the reaction of the reactant is more quickly stopped such that reactant is not wasted when hydrogen gas is not needed. When hydrogen gas is needed again, the pinch roller system 40 advances strip 56 into proximity with the heater 48 to continue the generation of hydrogen.

The pinch roller system 40 illustrated in FIGS. 1-5 includes first and second rollers 42 and 44 for advancing a flexible feed member. The pinch roller system 40 may include other pinch roller arrangements for advancing a flexible feed member, such as those arrangements shown in FIGS. 6A and 6B according to other embodiments. With particular reference to FIG. 6A, the pinch roller system 40 includes a single actuated pinch roller 42 contacting one side of the flexible feed member, such as flexible feed strip 56. The pinch roller system 40 includes a stationary second member 68 disposed on the opposite side of the flexible feed member 56. The stationary member 68 is shown having a curved surface contacting feed strip 56 with force due to a spring bias via spring 56. The friction between the pinch roller 42 and bottom surface of strip 56 is preferably greater that the friction between the stationary member 68 and the top surface of feed strip 56 so that the roller 42 is able to move the strip 56. As a result, a single pinch roller 48 may advance and retract movement of the flexible feed member 56 so as to bring the reactant 62 in proximity with heater 48 or retract the feed member 56 therefrom.

Referring to FIG. 6B, a further embodiment of a pinch roller system 40 is illustrated employing a single pinch roller 42 disposed on a top surface of the flexible feed member 56. The dividing wall 60 is shown having an upper curved surface in contact with the lower surface of the flexible feed member 56 such that the single pinch roller 42 is able to advance and retract the position of strip 56 relative to heater 48.

Figure 8:
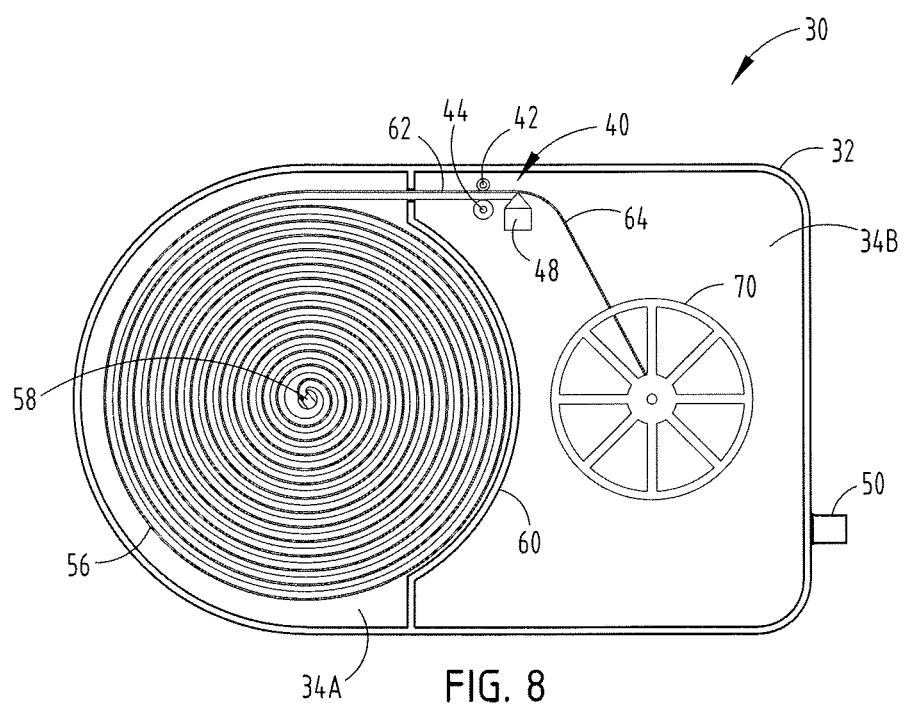
FIG. 8 is a side view of the hydrogen generator shown in FIG. 7.

Referring to FIGS. 7 and 8, a hydrogen generator 30 is illustrated having a flexible feed member in the form of a strip supplied on a feed reel 58, further including a fixed dividing wall 60 and a take up reel 70. The take up reel 70 is disposed within the waste zone 34B. As flexible feed strip 56 is fed by the pinch roller system 40 to pass in proximity to heater 48, the reactant 62 is consumed and the remaining carrier 64 is wound up on the take up reel 70. The take up reel 70 may include a spring loaded mechanism to automatically wind up the carrier 64, according to one embodiment. According to another embodiment, the take up reel 70 may be driven by a motor that moves in conjunction with the pinch roller system 40 to wind up the carrier 64 after the strip of reactant has been consumed.

The hydrogen generator 30 may be provided as a disposable generator intended to be disposed of once the reactant has been consumed, according to one embodiment. According to another embodiment, the hydrogen generator 30 may be reusable such that the used carrier and byproduct may be removed from the housing 32 and replaced by a fresh flexible feed member.

Accordingly, the hydrogen generator 30 advantageously generates hydrogen gas for use by a hydrogen consuming battery, such as a fuel cell or fuel stack. The hydrogen generator 30 provides for an easy to control reaction of reactants on a flexible feed member by controlling movement of the feed member relative to the heater. The hydrogen generator may quickly quench or stop the reaction of the reactant in a quick and efficient manner so as to control the reaction when hydrogen is needed.

The above description is considered that of the preferred embodiment only. Modifications of the invention will occur to those skilled in the art and to those who make or use the invention. Therefore, it is understood that the embodiment shown in the drawings and described above is merely for illustrative purposes and not intended to limit the scope of the invention, which is defined by the following claims as interpreted according to the principles of patent law, including the Doctrine of Equivalents.

The invention claimed is:

1. A hydrogen generator comprising:
    a housing;
    a flexible feed member comprising a flexible carrier and a hydrogen-containing reactant disposed on the carrier, wherein the hydrogen-containing reactant will react to release hydrogen gas when heated;
    a heating system comprising a heater;
    a pinch roller system for feeding the flexible feed member to position the flexible feed member in proximity to the heater such that the heater is capable of heating the hydrogen-containing reactant to release hydrogen gas;
    wherein the flexible feed member is formed into a fiber having the carrier formed around the reactant, and wherein the fiber is pulled by the pinch roller system from a storage area; and,
    wherein the pinch roller system comprises first and second pinch rollers, wherein movement of the flexible feed member is controlled by at least one of the first and second pinch rollers.

2. The hydrogen generator of claim 1, wherein the first pinch roller engages one side of the flexible feed member and the second pinch roller engages a second opposite side of the flexible feed member.

3. The hydrogen generator of claim 1, wherein the pinch roller system comprises a first roller engaging a first side of the feed member and a stationary member engaging an opposite second side of the feed member.

4. The hydrogen generator of claim 3, wherein the stationary member comprises a curved surface engaging the opposite second side of the feed member.

5. The hydrogen generator of claim 1, wherein the pinch roller system is controlled to stop movement of the feed member toward the heater and reverses direction of movement of the feed member a distance sufficient to quench the reaction and stop generation of hydrogen.

6. The hydrogen generator of claim 1, wherein the pinch roller system comprises a thermally conductive material in contact with the feed member to cool the feed member when a reacting portion of the feed member is in close proximity to the pinch roller system during a reverse direction of movement.

7. The hydrogen generator of claim 1, wherein the fiber comprises extruded reactant and the carrier forms a covering.

8. The hydrogen generator of claim 1:
    wherein the flexible feed member comprises a thin strip having the reactant disposed on at least one side of the carrier;
    wherein the strip is wound on a feed reel disposed within the housing; and,
    wherein the carrier winds onto a take-up reel after the reactant is heated.

9. The hydrogen generator of claim 1, wherein the strip is wound on a feed reel disposed within the housing.

10. The hydrogen generator of claim 1, wherein the carrier winds onto a take-up reel after the reactant is heated.

11. The hydrogen generator of claim 1, wherein further comprising a wall within the housing defining a storage compartment for storing the feed member.

12. The hydrogen generator of claim 11, wherein the wall is moveable to reduce the size of the storage compartment as the feed member is fed by the pinch roller system.

13. The hydrogen generator of claim 12, wherein the moveable wall separates the storage compartment from a waste compartment within the housing.

14. The hydrogen generator of claim 1, wherein the heater comprises an electric heater.

15. A fuel cell system comprising:
- a fuel cell comprising a hydrogen gas input; and
- a hydrogen generator comprising:
  - a housing;
  - a flexible feed member comprising a flexible carrier and a hydrogen-containing reactant disposed on the carrier, wherein the hydrogen-containing reactant will react to release hydrogen gas when heated;
  - a heating system comprising a heater;
  - a pinch roller system for feeding the flexible feed member to position the flexible feed member in proximity to the heater such that the heater is capable of heating the hydrogen-containing reactant to release hydrogen gas;
  - wherein the flexible feed member is formed into a fiber having the carrier formed around the reactant, and wherein the fiber is pulled by the pinch roller system from a storage area and,
  - wherein the pinch roller system comprises first and second pinch rollers, wherein movement of the flexible feed member is controlled by at least one of the first and second pinch rollers.

16. The fuel cell system of claim 15, wherein the hydrogen generator is a cartridge adapted to be coupled to the hydrogen gas input port such that the hydrogen generator is removable from the fuel cell.

17. The fuel cell system of claim 15, wherein the pinch roller system is controlled to stop movement of the feed member toward the heater and reverses direction of movement of the feed member a distance sufficient to quench the reaction and stop the generation of hydrogen.

18. A method of generating hydrogen with a hydrogen generator, said method comprising the steps of:
- providing a flexible feed member in a housing, said flexible feed member comprising a flexible carrier and a hydrogen-containing reactant disposed on the carrier, wherein the hydrogen-containing reactant will release hydrogen gas when heated;
- actuating a pinch roller system to feed the flexible feed member to position the flexible feed member in proximity to a heater such that the heater is capable of heating the hydrogen-containing reactant to release hydrogen gas;
- wherein the flexible feed member is formed into a fiber having the carrier formed around the reactant, and wherein the fiber is pulled by the pinch roller system from a storage area;
- stopping movement of the feed member toward the heater; and
- reversing direction of movement of the feed member a distance sufficient to quench the reaction and stop generation of hydrogen.

* * * * *